July 2, 1929.  E. P. CRESSLER  1,719,106

DENTAL FILM OR PLATE HOLDER

Filed Feb. 10, 1926

Inventor:
Edward P. Cressler.
Att'y.

Patented July 2, 1929.

1,719,106

UNITED STATES PATENT OFFICE.

EDWARD P. CRESSLER, OF NEWTON, KANSAS.

DENTAL FILM OR PLATE HOLDER.

Application filed February 10, 1926. Serial No. 87,390.

This invention relates to dental film or plate holders and has for an object the provision of a device of this character which is provided with a supporting element including a bite portion composed of a substance which is firm and stable at or below normal body temperature but is rendered plastic when heated somewhat above body temperature, whereby the holder may be accurately positioned.

Another object of the invention is the provision of a device of this character which may be accurately and quickly disposed in operative position in the mouth of a patient in the same relative position a plurality of times.

A further object of the invention is the provision of a film or plate holder embodying means performing the double function of maintaining a film or plate pack in assembled relation with the holder and at the same time protecting the mucous membrane from direct contact therewith.

A still further object of the invention is to provide a film or plate holder comprising a bite portion and a film or plate carrying portion separably united in fixed relative positions whereby a plurality of views may be made by utilizing a single pre-formed bite portion in turn with a plurality of like film or plate carrying portions, as, for instance, in making stereoscopic views.

With these and other objects in view, as will appear as the description proceeds, the invention consists of the novel features of construction, combinations of elements, and arrangements of parts hereinafter fully described and pointed out in the claims.

A full and complete understanding of the invention may be obtained from a consideration of the following detailed description, taken in connection with the accompanying drawings forming a part of the disclosure, it being understood that while the drawings show practical embodiments of the invention, the latter is not to be confined to the showing thereof, but may be changed and modified so long as such changes and modifications mark no material departure from the salient features of the invention as hereinafter fully described and claimed.

Figure 1:
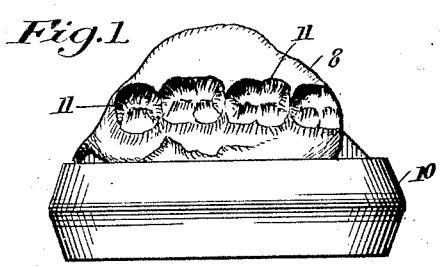
Figure 1 is a view in top plan of a dental film or plate holder having a film pack therein and embodying certain novel features of my invention.
Figure 2:
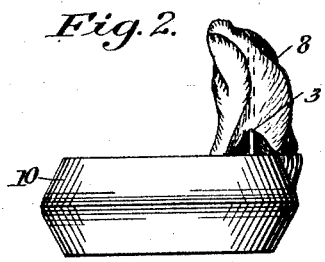
Fig. 2 is a view in side elevation thereof.
Figure 3:
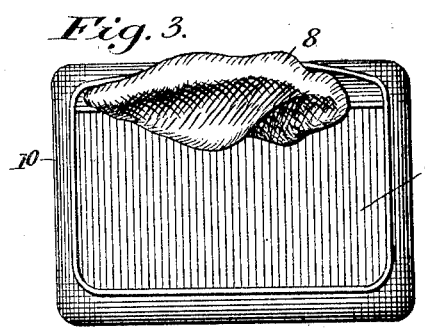
Fig. 3 is a view in front elevation of the same.

In the embodiment of the invention illustrated in Figs. 1 to 3, inclusive, and 11 to 13, inclusive, the reference-numeral 1 designates a blank of paper, fiber, metal which preferably is not impervious to X-ray, or any other material capable of being bent or shaped up into the desired form. A substantially C-shaped cut 2 is provided in the blank to permit bending of the upper portion 3 of the latter until it extends at right angles from the body-portion 4 to constitute a supporting wing. The side portions 5 of blank 1 and the upper portion 6 of the body 4 are also bent at right angles to the body 4 and have their free edges slightly inturned to constitute guiding and retaining flanges for a film pack 7 to be mounted within the holder.

A piece or mass 8 of material, which becomes plastic when heated above normal body temperature but is non-plastic and firm at or below the temperature of the body, is secured to the free end of the supporting wing 3 by means of apertures 9 through which portions of the mass are united. The substance employed for this purpose is preferably transparent to X-rays in order that it may not affect the showing obtained on the film or plate.

Figure 14:
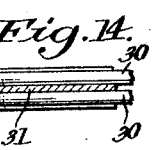
Fig. 14 is a fragmentary enlarged detail sectional view of a double film pack which may be used with any of the holders shown for stereoscopic work.

Preferably and as shown, the film pack 7, which may be either single as shown in Fig. 3 or double as shown in Fig. 14, is slid into the holder and held in fixed position with respect thereto by means of a comparatively wide elastic band 10 which passes around the body portion 4 of the holder and engages edge portions of the pack and holder. It will, of course, be understood that the elastic band 10 is of such size that it must be stretched somewhat in order to apply it to the holder with the pack disposed therein.

In the practice of the invention, the piece of material 8 is first heated in any desired manner, as, for instance, by immersing it in warm water, to render it plastic, and a film or plate pack 7 is then mounted in the holder and secured in position by application of the elastic band 10. The holder is then placed in the desired position in the mouth of the patient, who bites down upon the wing 3, thus pre-forming it by forming impressions 11 of the teeth in the plastic mass 8 which, when the mass has hardened, serve as extremely accurate means for positioning the holder in the mouth and for repositioning it in the same relative position therein any desired number of times. This latter feature is of especial value in the taking of views for stereoscopic work when it is essential that a plurality of views be taken of an object at different angles but with the films or plates in the same relative location for each of the views. It may also be desirable to take views illustrating the conditions in a particular tooth or a section of the jaw of a patient at different times, for comparison to determine the results of a course of treatment being pursued, in which event, the holder, being capable of sterilization by any of the known methods not requiring the application of heat, may be utilized as many times as desired for accurately locating the films or plates in the same position relative to the parts being treated.

The forms of holders illustrated in Figs. 4 to 10, inclusive, are also designed for use in the same manner as, but they differ structurally from, the form just described and are, for illustrative purposes only, shown unassembled with the elastic securing and protecting band, and in some of the views the pack 7 and the piece of material 8 are omitted or shown in dotted lines. It is to be understood, however, that my inventive-concept contemplates the use of these elements with all of the forms of holders shown in the drawing.

Figure 4:
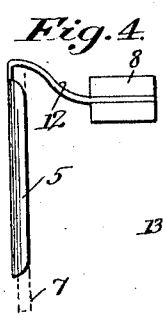
Fig. 4 and Fig. 5 are views in side and front elevation, respectively, of a modified form of holder.
Figure 5:
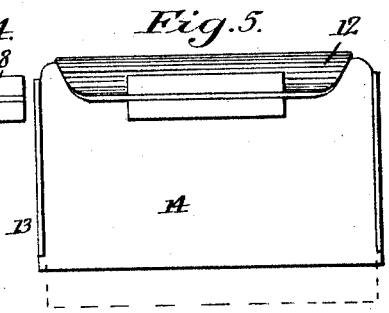

The holder shown in Figs. 4 and 5 differs from that above described in that the supporting wing 12 thereof is provided by bending the upper portion of the blank 13 at substantially right angles to the body portion 14, without cutting the blank, and then offsetting an intermediate portion of the wing in order to dispose the bite portion 8 thereof in proper position with respect to the body portion 14.

Figure 6:
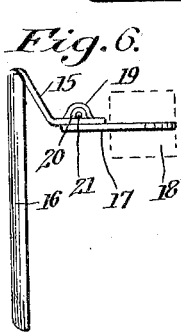
Fig. 6 and Fig. 7 are views in side elevation and top plan, respectively, of another modified form of film or plate holder.
Figure 7:
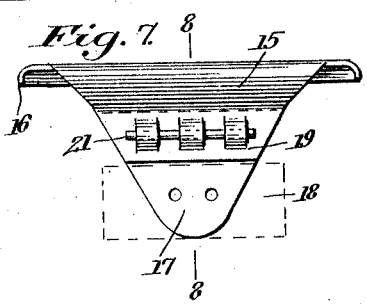
Figure 8:
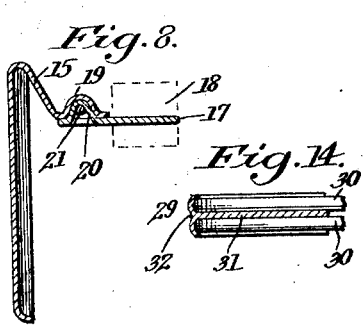
Fig. 8 is a vertical section view thereof, taken on line 8—8 of Fig. 7.

The holder shown in Figs. 6, 7 and 8 is quite similar to that shown in Figs. 4 and 5, but differs therefrom in that the supporting wing thereof is made up of a bent portion 15 integral with the body 16 of the holder and a flat portion 17 which carries the impression-receiving material 18, these portions being detachably or separably secured together. Preferably and as shown, the portions 15 and 17 are rigidly joined by means of pressed-up loops 19 and 20 provided in the respective portions, the loops 20 extending through the portion 17 into engagement with the undersides of loops 19, and a pin 21 passing through the loops 20 and resting upon the surface of the portion 15. If desired, the body portion 16 may be pressed up cup-wise, as shown, or the edge at the side where the film pack is to be inserted may be straight as shown in the embodiments hereinbefore described. The advantage of this two-part construction of the holder is that after an impression has once been made on a portion 17, any number of views can be made, each in a different body portion, and the portion 17 may be filed away during the interim between the taking of the different views. If desired, the film or plate carrying body, including portions 15 and 16, with a film or plate therein, may be provided to the trade as a separate article of manufacture.

Figures 9, 10:
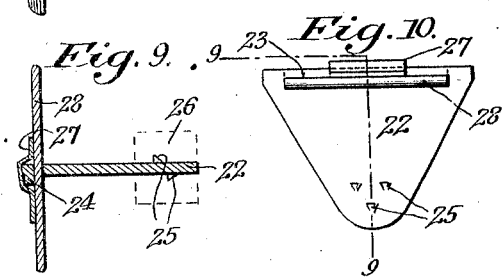
Fig. 9 is a vertical section view, taken on line 9—9 of Fig. 10.
Fig. 10 is a top plan view of another form of holder.
Figure 13:
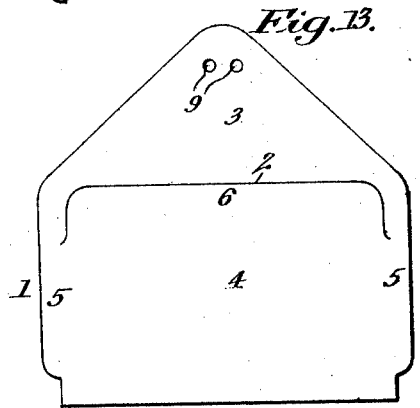
Fig. 13 is a view in plan of a blank from which the holder shown in Figs. 11 and 12 is formed.
Figure 11:
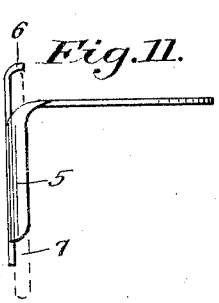
Fig. 11 and Fig. 12 are views in side elevation and vertical section, respectively, of the holder shown in Figs. 1, 2 and 3.
Figure 12:
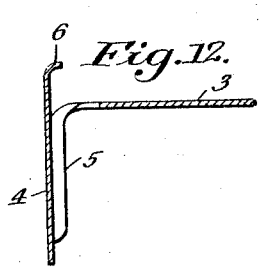

The embodiment of the invention disclosed in Figs. 9 and 10 comprises a flat, substantially triangular-shaped blank 22 having a film pack receiving slot 23 formed therein by cutting the material of the blank along three sides of the slot and bending the portion 24 inclosed by the cuts at right angles to the blank to constitute a pack-engaging member. In this instance, in lieu of the holes 9, as shown in Fig. 13, projections 25 are provided and extend into the impression-receiving material 26 to prevent its disassociation from the holder.

An adhesive strip 27 applied to the film pack 28 above and below the slot 23 and passing over the bent-down portion 24 serves to maintain the pack in fixed relation with respect to the holder.

The holders disclosed in the embodiments of my invention shown in Figs. 1 to 5 and 11 to 13 are especially adapted to hold a double film pack 29 of the type shown, for instance, in Fig. 14, and which comprises two single film packs 30 spaced apart and enclosed by a formed-up casing 31 of metal impervious to Roentgen rays, by reason of the turned-in edges 5 of the holders which may engage in the groove 32 formed in the casing 31 and serve to guide and hold the pack.

What I claim is:

1. A dental film pack holder comprising a container, a film pack disposed therein, and means for maintaining the pack associated with the container and for covering edge portions of the container to prevent contact thereof with the mucous membrane of a patient when the holder is in use.

2. A dental film pack holder comprising a container, a film pack disposed therein, and elastic means for maintaining the pack associated with the container and for covering edge portions of the container to prevent contact thereof with the mucous membrane of a patient when the holder is in use.

3. In combination, a dental-film-pack holder including a plate having inturned pack engaging edges; a double film pack removably associated with the holder and comprising two single film packs separated and inclosed by a formed up casing having guiding and holding grooves formed for engagement with said edges; an elastic member encircling and engaging the holder and double film pack to maintain them in fixed relation to each other; a supporting member extending in fixed relation to the holder and having therein a pre-formed positioning means whereby the assembled holder and double pack may be accurately positioned in the mouth of a patient, the film in one of the single packs be exposed, the double pack be removed, turned over, and then replaced in the holder and the assembled holder and double pack be accurately replaced in the mouth.

4. A dental film pack holder including a body portion having inturned marginal flanges, one of said flanges being further bent to provide a support extending at an angle to the body portion.

In testimony whereof, I have affixed my signature hereto.

EDWARD P. CRESSLER.